(12) United States Patent
Rossignol et al.

(10) Patent No.: US 6,416,855 B1
(45) Date of Patent: Jul. 9, 2002

(54) COMPOSITE MATERIAL CONTAINING FINE PARTICLES OF METAL DISPERSED IN POLYSILYLENEMETHYLENE AND PROCESS FOR THE PREPARATION THEREOF

(75) Inventors: Fabrice Rossignol, Limoges (FR); Masaaki Suzuki, Sapporo (JP); Hideaki Nagai, Sapporo (JP); Yoshinori Nakata, Sapporo (JP); Takeshi Okutani, Sapporo (JP); Nobuo Kushibiki, Fujisawa (JP); Masashi Murakami, Hadano (JP)

(73) Assignees: Dow Corning Asia, Ltd.; National Institute of Advanced Industrial Science and Technology, both of Tokyo (JP)

( * ) Notice: Subject to any disclaimer, the term of this patent is extended or adjusted under 35 U.S.C. 154(b) by 0 days.

(21) Appl. No.: 09/351,859

(22) Filed: Jul. 13, 1999

(30) Foreign Application Priority Data

Jul. 13, 1998 (JP) .............................. 10-197638

(51) Int. Cl.$^7$ ........................... B32B 5/16; B32B 27/04; B32B 15/02
(52) U.S. Cl. ...................... 428/323; 428/328; 428/332; 428/338; 428/446
(58) Field of Search ................................ 428/220, 323, 428/328, 332, 338, 411.1, 446, 923, 926; 524/440; 528/35; 427/250, 255.6, 387

(56) References Cited

FOREIGN PATENT DOCUMENTS

| EP | 392 703 A2 | 3/1990 |
| EP | 392 703 A3 | 10/1990 |

OTHER PUBLICATIONS

"Patent Abstracts of Japan" Pub. No. 08109266 (Apr. 30, 1996); Pub. No. 09208831 (Aug. 12, 1997); Pub. No. 07196986 (Aug. 1, 1995).

European Search Report, Nov. 8, 1999.

Rossignol, F: "New Synthesis Method of Poly(diphenylsilylenemethylene) Thin Films"; Jul. 25, 1998; Chemistry of Materials, vol. 10, No. 8; pp. 2047–2049.

Rossignol, F: "Properties of Poly(diphenylsilylenemethylene) Thin Films Fabricated With Fine metal Particles"; Jan. 27, 1999; Chemistry of Materials; vol. 11, No. 2; pp. 367–373.

*Primary Examiner*—Stevan A. Resan
(74) *Attorney, Agent, or Firm*—Duane Morris LLP

(57) ABSTRACT

A composite material having a plurality of laminated polysilylenemethylene layers each having an inside region adjacent to a surface thereof in which nanoparticles of a metal of Au, Pt, Pd, Cu or Ag are dispersed. The composite material is produced by heating a layer of disilacyclobutane overlaid with a layer of nanoparticles of the above metal to polymerize the disilacyclobutane. The above procedure is repeated at least once more.

5 Claims, 2 Drawing Sheets

COMPOSITE MATERIAL CONTAINING FINE PARTICLES OF METAL DISPERSED IN POLYSILYLENEMETHYLENE AND PROCESS FOR THE PREPARATION THEREOF

BACKGROUND OF THE INVENTION

This invention relates to a composite material having metal nanoparticles dispersed in a polysilylenemethylene (this polymer may also be called polysilmethylene), of which use is expected as an optical functional material, and to a process for the production thereof.

As metal nanoparticles or semiconductor nanoparticles having size of nanometer order shows non-linear optical effects, a composite material having the nanoparticles dispersed in polymer or glass matrix is drawing attention as an optical functional material. One known method of preparing such a composite material is a vapor phase method in which nanoparticles of a metal or a semiconductor, which have been produced by vacuum deposition, sputtering or CVD, are covered with an inert substance by sputtering. Another known method includes dispersing nanoparticles of a metal or a semiconductor in a porous glass formed by a sol-gel method. In a further known method, such nanoparticles of semiconductor are prepared simultaneously with a sol-gel glass and are dispersed therein. In addition to the above three ordinary methods, there are known methods in which into a metallic semiconductor component previously dispersed in a polymer another component element is introduced, and it is subject to irradiation with a laser beam to selectively form nanoparticles, and a method in which a polymer film, which is thermodynamically in stable condition, is heated in contact with a metal film to stabilize the polymer and to disperse the metal in form of nanoparticles into the polymer film.

The conventional dispersion matrix system of nanoparticles has such a problem that as the nanoparticle has high surface energy, it is not necessarily inert to a matrix, and it is apt to form a chemical bond between the surface thereof and the matrix to cause to change state of the nanoparticle from the original state. Another problem of the conventional methods is that the nanoparticles are apt to form aggregates in the matrix, so that the composite material fails to show satisfactory non-linear characteristics and causes light scattering.

SUMMARY OF THE INVENTION

It is, therefore, an object of the present invention to provide a composite material in which nanoparticles of a metal are dispersed in a chemically inert polymer.

Another object of the present invention is to provide a composite material having the nanoparticles dispersed therein, in which aggregation among the metal nanoparticles is inhibited with the chemically inert material.

It is a further object of the present invention to provide a composite material having the nanoparticles dispersed therein, in which the optical effects by the nanoparticles are enhanced by forming multi-layers of the nanoparticle dispersing layer, so that a higher content of the nanoparticle may be present.

It is yet a further object of the present invention to provide a composite material having the nanoparticles dispersed therein, in which a region having a higher content of the nanoparticles and a region having no or much less content of the nanoparticle are alternately arranged so that the composite material can function as a diffraction grating.

It is yet a further object of the present invention to provide a process which can easily produce the above composite material.

In accomplishing the foregoing object, there is provided in accordance with the present invention a composite material comprising a laminate formed by laminating a plurality of polysilylenemethylene layers in which nanoparticles of a metal are dispersed in an inside region adjacent to a top surface thereof, the metal being selected from the group consisting of gold, platinum, palladium, copper and silver.

In another aspect, the present invention provides a process for producing a composite material having nanoparticles of a metal dispersed, comprising the steps of:

(a) forming, on a substrate, a layer of disilacyclobutane capable of providing polysilylenemethylene via ring open polymerization:

(b) forming a layer of nanoparticles of a metal selected from the group consisting of gold, platinum, palladium, copper and silver on a surface of said disilacyclobutane layer obtained in step (a);

(c) heating said disilacyclobutane layer, on which said nanoparticle layer has been formed in step (b), at the temperature capable of polymerizing said disilacyclobutane but not higher than the melting point of the polysilylenemethylene derived from said disilacyclobutane, thereby forming a first polysilylenemethylene layer in which said nanoparticles are dispersed in an inside region adjacent to a surface thereof;

(d) forming another layer of disilacyclobutane on the first polysilylenemethylene layer obtained in step (c), said disilacyclobutane capable of providing polysilylenemethylene via ring open polymerization;

(e) forming a layer of nanoparticles of a metal selected from the group consisting of gold, platinum, palladium, copper and silver on a surface of said disilacyclobutane layer obtained in step (d); and (f) heating said disilacyclobutane layer, on which said nanoparticle layer has been formed in step (e), at the temperature capable of polymerizing said disilacyclobutane but not higher than the melting point of the polysilylenemethylene derived from said disilacyclobutane, thereby forming a second polysilylenemethylene layer, in which said nanoparticles are dispersed in an inside region adjacent to a surface thereof.

A cycle of the above steps (d) through (f) is repeated at least two times, thereby forming a laminate of three or more polysilylenemethylene layers each, in which said nanoparticles are dispersed in an inside region adjacent to a surface thereof.

DETAILED DESCRIPTION OF THE PREFERRED EMBODIMENTS OF THE INVENTION

Disilacyclobutane employed in the present invention is a compound represented by the following formula (1):

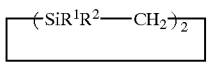

(1)

in which $R^1$ represents a lower alkyl group or aromatic group, and $R^2$ represents an aromatic group. The alkyl group is exemplified by methyl, ethyl, propyl, and butyl groups. The aromatic group is exemplified by phenyl, tolyl, and naphthyl groups. $R^1$ and $R^2$ are preferably and same or different aromatic groups, with most preference of phenyl group.

The disilacyclobutane of the formula (1) may be synthesized by a method reported by N. Auner and J. Grobe (J. Organometal. Chem., 188, 151 (1980)). For example, 1,1,3,3-tetraphenyl-1,3-disilacyclobutane (melting point: 133–137° C.) may be prepared by subjecting chloromethyldiphenylsilane to dimerization in the presence of metallic magnesium.

When heated at, for example, about 100° C. or more in the presence or the absence of the metal nanoparticles, the disilacyclobutane may polymerize to form a polysilylenemethylene containing a repeating unit represented by the following formula (2):

 (2)

in which $R^1$ and $R^2$ are as defined above.

The polysilylenemethylene of the formula (2) has a high heat resistance and luminesces when subjected to irradiation with UV light laser beam. The physical properties including crystallinity of the polysilylenemethylene vary depending upon the kind of the groups $R^1$ and $R^2$.

Figure 1:
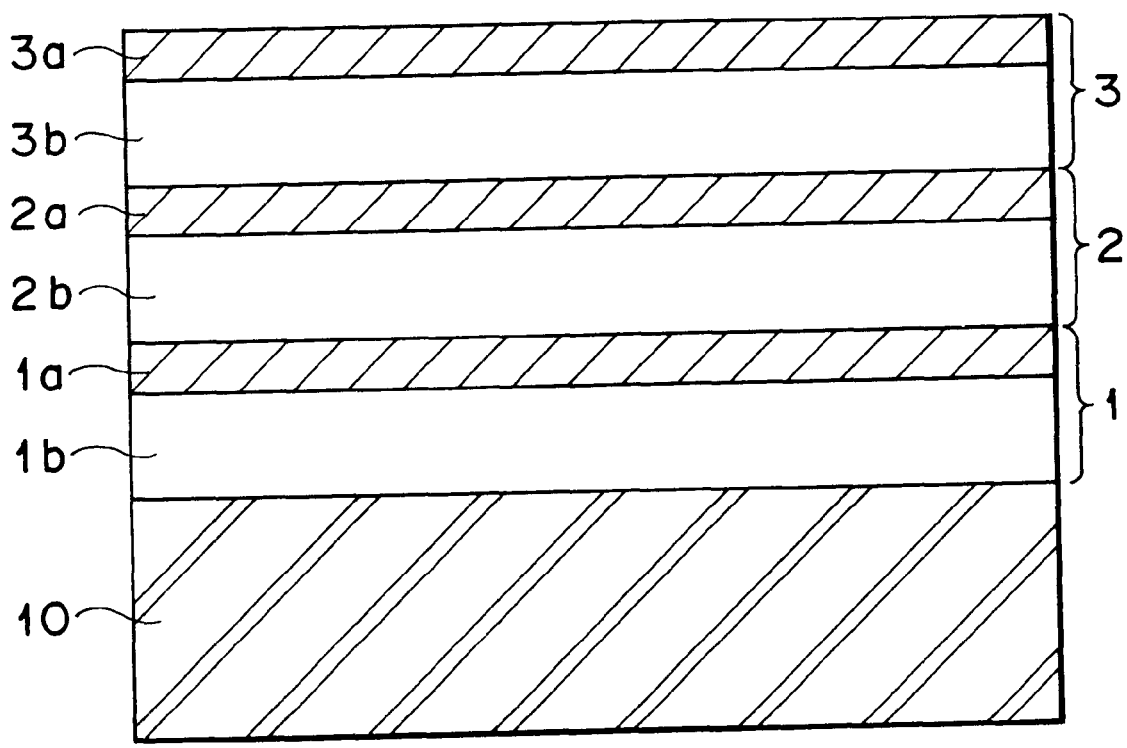
FIG. 1 is a sectional view diagrammatically illustrating one embodiment of a composite material according to the present invention.

Referring now to FIG. 1 which shows one embodiment of a composite material according to the present invention, reference numerals 1 through 3 designate first through third polysilylenemethylene layers, respectively, supported on a substrate 10.

The first polysilylenemethylene layer 1 is composed of a region 1a adjacent to a surface of the layer 1 in which nanoparticles of a metal are dispersed, and a region 1b contiguous with the region 1a and containing substantially no such nanoparticles. The substantially no content of the nanoparticles means in the present invention that the content of the nanoparticles in the region 1b is almost zero or much less than in the region 1a, such that the non-linear optical effects are not satisfactorily shown in the region 1b. Similarly, the second polysilylenemethylene layer 2 is composed of a region 2a adjacent to a surface of the layer 2 in which nanoparticles of a metal are dispersed, and a region 2b contiguous with the region 2a and containing substantially no such particles. The third polysilylenemethylene layer 3 is also composed of a region 3a adjacent to a surface of the layer 3 in which nanoparticles of a metal are dispersed, and a region 3b contiguous with the region 3a and containing substantially no such particles.

While the specific embodiment of the composite material shown in FIG. 1 has three laminated polysilylenemethylene layers 1–3, the number of the polysilylenemethylene layers may be two or more and suitably selected according to the intended use of the composite material. The inside region 1a–3a preferably has an average thickness in the range of 0.01–9 $\mu$m.

The metal dispersed in each of the polysilylenemethylene layers is selected from gold, platinum, palladium, copper and silver and is employed as nanoparticles preferably having an average particle diameter in the range of 1–10 nm.

The substrate 10 may be made of any suitable material e.g. a glass, a synthetic polymeric material such as polysilylenemethylene, a metal such as silicon wafer or a ceramic.

The composite material shown in FIG. 1 may be prepared as follows.

Step (a):

First, a layer of a disilacyclobutane is formed on a substrate 10 by, for example, vapor phase deposition or application of a coating liquid. The disilacylobutane layer preferably has a thickness in the range of 0.01–3 $\mu$m.

The vapor phase deposition of the disilacyclobutane may be carried out in any suitable manner. For the purpose of accelerating the vapor phase deposition, the disilacyclobutane may be heated at such a temperature that does not cause the ring open polymerization thereof. For reasons of improving uniformity of the disilacyclobutane layer, it is preferred that the substrate be previously heated at such a temperature that does not cause the ring open polymerization of the disilacyclobutane. For the same reasons, the disilacyclobutane layer thus formed on the substrate is preferably heated at such a temperature that does not cause the ring open polymerization thereof.

The coating liquid may be an organic solvent solution of the disilacyclobutane. The organic solvent may be, for example, an aromatic hydrocarbon such as toluene or xylene or a halogenated hydrocarbon such as methylene chloride, ethylene chloride or chloroform. The coating liquid is applied by any suitable method such as spin coating or bar coating and then dried to obtain a layer of the disilacyclobutane.

Step (b):

On a surface of the disilacyclobutane layer obtained in step (a), a layer of nanoparticles of a metal selected from the group consisting of gold, platinum, palladium, copper and silver is formed by, for example, vacuum deposition. It is preferred to form the metal nanoparticle layer on the substrate in shape of sparse mono-particle layer or aggregation of the nanoparticles. It is important that the nanoparticle layer is not continuous layer where the nanoparticles are chemically or physically bonded each other so that the nanoparticles can not be dispersed in the disilacyclobutane layer during formation of polysilylenemethylene layer. The thickness of the metal nanoparticle layer is preferably 10 nm or less. The lower limit of the layer will be defined, depending on the size of the metal nanoparticles.

Step (c):

The disilacyclobutane layer, on which the nanoparticle layer has been formed in step (b), is then heated at the temperature capable of polymerizing the disilacyclobutane but not higher than the melting point of the polysilylenemethylene produced by the polymerization, thereby forming a first polysilylenemethylene layer 1 having an inside region 1a adjacent to a surface thereof in which the nanoparticles of the metal are dispersed on the substrate 10. Namely, when the disilacyclobutane layer, on which the nanoparticle metal layer has been formed, is heated, the nanoparticles are dispersed inside the disilacyclobutane layer to induce ring open polymerization thereof.

Suitable polymerization temperature varies depending upon the kind of the disilacyclobutane used. In the case of tetraphenyldisilacyclobutane, for example, polymerization begins proceeding at about 100° C., therefore it is not necessary to increase the heating temperature up to the melting point thereof (137° C.). The melting point of the polymer (polydiphenylsilylenemethylene) derived from tetraphenyldisilacyclobutane is about 350° C. Thus, the polymerization is suitably carried out at a temperature of about 100° C. to about 300° C.

By the above heat treatment, there is formed the first polydiphenylsilylenemethylene layer 1 by the polymerization of disilacyclobutane, in which nanoparticles of a metal are dispersed in an upper region 1a adjacent to a surface of the layer 1. Below the region 1a, a lower region 1b containing substantially no such nanoparticles is formed in the first polydiphenylsilylenemethylene layer.

Steps (d)–(f):

On the first polysilylenemethylene layer 1 obtained in step (c), another layer of disilacyclobutane is formed (step (d)) in the same manner as that in step (a). A layer of nanoparticles of a metal is then formed on a surface of the disilacyclobutane layer (step (e)) in the same manner as that in step (b). Thereafter the disilacyclobutane layer, on which the nanoparticles layer has been formed is heated (step (f)) in the same manner as that in step (c), so that the second polysilylenemethylene layer 2, composed of a region (2a) in which the nanoparticles of a metal are dispersed and a region (2b) in which substantially no such particles are present, is formed on the first polysilylenemethylene layer 1.

A cycle of steps (d)–(f) is repeated to form the third polysilylenemethylene layer 3 on the layer 2. If desired, such a cycle of steps (d)–(f) is further repeated one or more times to prepare a composite material having one or more polysilylenemethylene layers in addition to the above first, second and third polysilylenemethylene layers 1 through 3.

If desired, the substrate on which a plurality of polysilylenemethylene layers have been thus formed may be removed by any conventional method such as etching to leave a laminate of the plurality of polysilylenemethylene layers.

The thickness of the metal particles-containing region (1a, 2a and 3a in FIG. 1) of each of the polysilylenemethylene layers 1–3 depends upon a lot of conditions, such as the thickness of the disilacyclobutane layer, the thickness of the nanoparticle layer formed thereon, tendency of the nanoparticles to diffuse into the disilacyclobutane layer and the temperature at which the disilacyclobutane layer is heated for polymerization thereof. For example, the smaller the thickness of the disilacyclobutane layer, the smaller becomes the average thickness of the metal nanoparticles-containing region. Also, the lower the temperature at which the disilacyclobutane layer is heated, the smaller becomes the average thickness of the metal nanoparticles-containing region. In the case of tetraphenyldisilacyclobutane, suitable embodiments is that polymerization temperature is 230–270° C., when the polymerization time is 5–15 minutes.

A distance between the most dense point (the point at which the particles exist most densely) in one metal particles-containing region (e.g. the region 1a) and the densest point in its adjacent metal particles-containing region (e.g. the region 2a) (called "inter-region distance"), may be controlled by varying the thickness of the disilacyclobutane layer to preferably be in the range of 0.01–10 microns. However, it is of course possible to produce one having the inter-region distance with more than 10 microns, when uniformity of the thickness of the polysilylenemethylene layer is not significantly required. Further, the inter-region distance may be less than 0.01 microns. When the inter-region distance is extremely small, it may not keep the distance between two adjacent metal nanoparticles regions, reversely may be in form of polysilylenemethylene layer having the nanoparticles wholly dispersed therein.

The composite material according to the present invention exhibits non-linear optical characteristics due to the presence of nanoparticles of a metal and may be used as an element for modulating phase, intensity or frequency of a light.

Because of a plurality of laminated polysilylenemethylene layers each containing metal nanoparticles, the content of the metal nanoparticles in the composite material is so high that the sensitivity of the optical element is enhanced. In this connection, the transmission electron microscopic analysis reveals that the metal nanoparticles contained in each of the laminated polysilylenemethylene layers do not form aggregates.

The composite material, which is constructed such that high density regions each containing metal nanoparticles and low density regions each containing substantially no or almost no metal nanoparticles are alternately arranged, can function as an optical diffraction grating. In particular, by suitably adjusting the thickness of the regions each containing nanoparticles and the distance between adjacent two metal nanoparticle-containing regions, the composite material may be suitably used as a diffraction grating for a radiation having a wavelength corresponding to far ultraviolet rays to soft X-rays.

The polysilylenemethylene, which has repeating structure of C—Si bonds, may serve as a precursor for silicon carbide. Thus, the composite material according to the present invention may provide a composite ceramic material in which metal nanoparticles are dispersed in a matrix of SiC or which has a plurality of alternately arranged metal nanoparticle-free SiC regions and metal nanoparticle-containing SiC regions. These composite ceramic materials can be used in various applications utilizing the non-linear optical effects of the metal nanoparticles and/or electrical charcteristics of the SiC matrix.

In addition, when the metal nanoparticles have a catalytic activity, the composite material can be used as a catalyst in which catalytic components are supported by heat-resistant matrix.

The following examples will further illustrate the present invention.

EXAMPLE 1

According to usual process, chloromethyldiphenylchlorosilane obtained by reaction of chloromethyltrichlorosilane with phenyl magnesium chloride. Chloromethyldiphenylchlorosilane (20 g) was added dropwise through 2 hours to a mixture containing 2.5 g of metallic magnesium flakes and 100 ml of tetrahydrofuran. After completion of the addition of chloromethyldiphenylchlorosilane, the mixture was refluxed for 5 hours with stirring. After addition of 80 ml of toluene, the reaction mixture was cooled and mixed with 100 ml of water. The resulting mixture was again cooled and mixed with another 100 ml of water. The organic phase was then separated from the aqueous phase, washed with water, dehydrated with magnesium sulphate and then concentrated with rotary evaporator for the removal of the solvent, thereby obtaining 14 g (yield: about 100%) of 1,1,3,3-tetraphenyl-1,3-disilacyclobutane (a compound of the formula (1) in which $R^1$ and $R^2$ are phenyl groups) as crude crystals.

The crude crystals were recrystallized from ether solution of the crude crystals to obtain pure crystals having a melting point of 133–137° C. (by DSC analysis using a heating rate of 10° C./min). The recrystallized product was further purified by sublimation and then vacuum-deposited on a silicon wafer at $10^{-3}$ Torr to form a layer of 1,1,3,3-tetraphenyl-1,3-disilacyclobutane having a thickness of about 1.2 μm. On the cyclobutane layer was then deposited platinum by sputtering with an air plasma at $10^{-3}$ Torr to form thereon a layer of platinum nanoparticles having a thickness of about 4 nm. This was then placed in a furnace and heated at 250° C. for 10 minutes in air, thereby to form a first polysilylenemethylene layer having platinum nanoparticles dispersed in an inside region adjacent to a surface thereof, thereby constituting said inside region having higher content of the platinum nanoparticles and other region having no or much less content of the platinum nanoparticles.

Deposition of 1,1,3,3-tetraphenyl-1,3-disilacyclobutane, deposition of platinum particles thereon and heat treatment of the deposited layers were repeated twice more in the same manner as described to obtain a composite material having a second polysilylenemethylene layer on the first polysilylenemethylene layer and a third polysilylenemethylene layer on the second polysilylenemethylene layer.

The inside region adjacent to a top surface of the first polysilylenemethylene layer and having higher content of the nanoparticles is called first region. Similarly, that of the second polysilylenemethylene layer is called second region, that of the third polysilylenemethylene layer is called third region.

Figure 2:
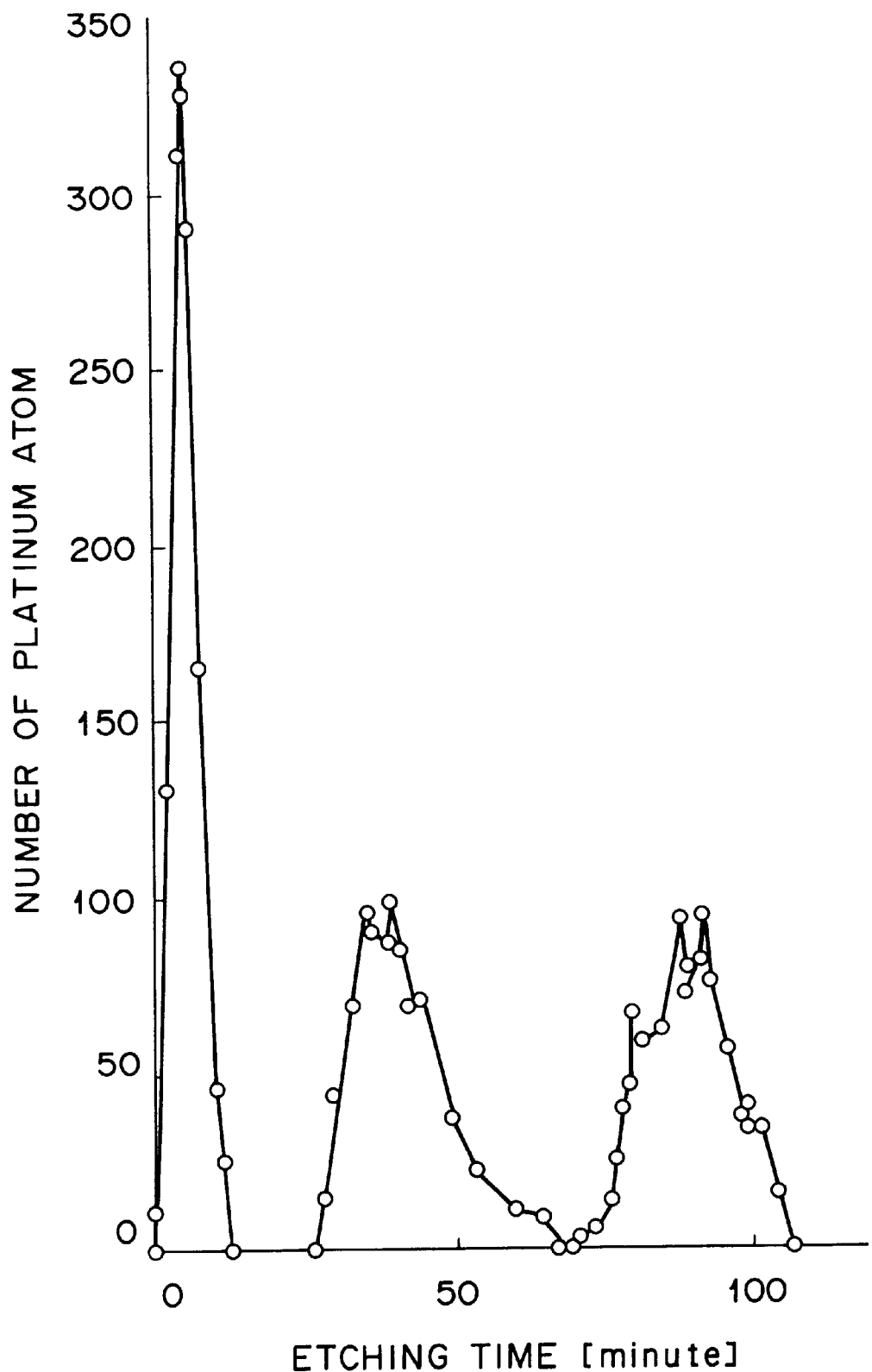
FIG. 2 is a graph showing distribution of platinum element in the thickness direction of a composite material according to the present invention obtained in Example 1.

The composite material was measured for the distribution of platinum atoms along the thickness direction of the laminated first to third layers by XPS (X-ray photoelectronic spectroscopy) while etching the layers with Ar ions. The results are shown in FIG. 2. From the results of the measurement, the average thicknesses of the inside regions of the first to third polysilylenemethylene layers were found to be 1 μm, 1 μm and 0.2 μm, respectively. The inter-region distances between the platinum nanoparticle-containing regions of the first and second polysilylenemethylene layers and between the second and third polysilylenemethylene layers were 2 μm and 1.3 μm, respectively.

The particle size of the platinum nanoparticles in the first polysilylenemethylene layer was measured, before the formation of the second polysilylenemethylene layer thereon, by transmission electron microscope to reveal that the average diameter of platinum nanoparticles was 2.6 nm. The average particle diameter of the platinum nanoparticles in the third polysilylenemethylene layer was also measured to be 2.6 nm.

Each of the first to third polysilylenemethylene layers was measured for infra red absorption spctra. It was found that the absorption band at 937 $cm^{-1}$ inherent to the four-member ring of C—Si bonds of 1,1,3,3-tetraphenyl-1,3-disilacyclobutane disappeared, while absorption bands at 1,074, 1,051 and 779 $cm^{-1}$ attributed to the polysilylmethylene skeleton were observed, thereby indicating that polysilylenemethylene was produced by polymerization of 1,1,3,3-tetraphenyl-1,3-disilacyclobutane. Further, the wide angle X-ray diffraction analysis did not reveal any peaks attributed to a crystal structure, thereby indicating that polysilylenemethylene produced was amorphous.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. H10-197,638, filed Jul. 13, 1998, inclusive of the specification, claims and drawings, are hereby incorporated by reference herein.

What is claimed is:

1. A composite material comprising a laminate comprising a plurality of polysilylenemethylene layers in which nanoparticles of a metal selected from the group consisting of gold, platinum, palladium, copper and silver are dispersed, wherein each polysilylenemethylene layer in the plurality is prepared by forming and heating a layer of disilacyclobutane and a layer of nanoparticles on the layer of disilacyclobutane, thereby forming a layer of polysilylenemethylene containing nanoparticles, followed by forming and heating a layer of disilacyclobutane and a layer of nanoparticles onto the previous layer of polysilylenemethylene containing nanoparticles, thereby forming another layer of polysilylenemethylene containing nanoparticles.

2. The composite material of claim 1, wherein each polysilylenemethylene layer in the plurality comprises an upper region having the nanoparticles dispersed therein and a lower region having substantially no nanoparticles, wherein the upper region is adjacent to a top surface of the layer and the lower region is contiguous with the upper region, and wherein the layers in the plurality are alternately arranged such that the upper region of one layer is laminated onto the lower region of another layer in the plurality.

3. The composite material of claim 2, wherein the upper region of each layer has an average thickness in the range of 0.01 to 9 micrometers.

4. The composite material of claim 1, wherein the polysilylenemethylene has a skeletal structure comprising a repeating unit represented by the formula: —(SiR$^1$R$^2$CH$_2$)—, wherein R$^1$ represents a group selected from the group consisting of lower alkyl groups and aromatic groups and R$^2$ represents an aromatic group.

5. The composite material of claim 1, wherein the polysilylenemethylene has a skeletal structure comprising a repeating unit represented by the formula: —(SiR$^1$R$^2$CH$_2$)—, wherein each R$^1$ independently represents an aromatic group and each R$^2$ independently represents an aromatic group.

* * * * *